United States Patent
Murray

(10) Patent No.: US 11,819,016 B2
(45) Date of Patent: Nov. 21, 2023

(54) LURING INSECT TRAP

(71) Applicant: Ophelia Murray, Chicago, IL (US)

(72) Inventor: Ophelia Murray, Chicago, IL (US)

( * ) Notice: Subject to any disclaimer, the term of this patent is extended or adjusted under 35 U.S.C. 154(b) by 0 days.

(21) Appl. No.: 17/724,822

(22) Filed: Apr. 20, 2022

(65) Prior Publication Data

US 2023/0337652 A1 Oct. 26, 2023

(51) Int. Cl.
*A01M 1/14* (2006.01)
*A01M 1/02* (2006.01)

(52) U.S. Cl.
CPC ............ *A01M 1/145* (2013.01); *A01M 1/023* (2013.01); *A01M 1/026* (2013.01)

(58) Field of Classification Search
CPC ....... A01M 1/023; A01M 1/026; A01M 1/145
USPC .................................................... 43/113–117
See application file for complete search history.

(56) References Cited

U.S. PATENT DOCUMENTS

| | | | | |
|---|---|---|---|---|
| 1,723,919 A * | 8/1929 | Bykowy | ............... | A01M 1/145 43/107 |
| 3,023,539 A * | 3/1962 | Emerson, Jr. | ......... | A01M 1/145 43/113 |
| 3,956,848 A * | 5/1976 | Job | ....................... | A01M 1/145 43/115 |
| 4,117,624 A * | 10/1978 | Phillips | ................. | A01M 1/145 43/113 |
| 4,283,878 A * | 8/1981 | Hill | ..................... | A01M 1/2077 43/122 |
| 5,142,815 A * | 9/1992 | Birdsong | .............. | A01M 1/145 43/113 |
| 5,203,816 A * | 4/1993 | Townsend | ............. | A01M 1/145 43/113 |
| 5,251,397 A * | 10/1993 | Exum | ................... | A01M 1/145 43/115 |
| 5,425,197 A * | 6/1995 | Smith | ..................... | A01M 1/14 43/113 |
| 5,513,465 A * | 5/1996 | Demarest | .............. | A01M 1/145 43/113 |
| 5,974,727 A * | 11/1999 | Gilbert | .................. | A01M 1/145 43/113 |
| 6,108,965 A * | 8/2000 | Burrows | ............... | A01M 1/145 43/113 |
| 6,393,759 B1 * | 5/2002 | Brown | .................. | A01M 1/023 43/113 |
| 6,397,515 B1 * | 6/2002 | Brown | .................. | A01M 1/023 43/113 |

(Continued)

FOREIGN PATENT DOCUMENTS

| CN | 102036554 A | * | 4/2011 | ............. A01M 1/02 |
|---|---|---|---|---|
| CN | 103796511 A | * | 5/2014 | ............. A01M 1/04 |

(Continued)

*Primary Examiner* — Magdalena Topolski
*Assistant Examiner* — Morgan T Jordan
(74) *Attorney, Agent, or Firm* — The Iwashko Law Firm, PLLC; Lev Ivan Gabriel Iwashko

(57) ABSTRACT

A luring insect trap, including a light unit, a trap unit removably connected to at least a portion of the light unit to store at least one insect attractant therein and receive at least one insect therein, at least one light rod removably connected to at least a portion of the light unit to illuminate in response to being turned on, and a cover panel removably connected to at least a portion of the light unit to obscure the at least one light rod.

3 Claims, 3 Drawing Sheets

(56) References Cited

U.S. PATENT DOCUMENTS

| | | | | |
|---|---|---|---|---|
| 6,560,919 B2* | 5/2003 | Burrows | | A01M 1/145 43/107 |
| 6,655,078 B2* | 12/2003 | Winner | | F23D 14/28 43/107 |
| 11,197,472 B1* | 12/2021 | Favor, III | | A01M 1/023 |
| 11,582,964 B2* | 2/2023 | Ali | | A01M 1/223 |
| 2002/0032980 A1* | 3/2002 | Nelson | | A01M 1/145 43/113 |
| 2002/0073611 A1* | 6/2002 | Greening | | A01M 1/223 43/113 |
| 2003/0000127 A1* | 1/2003 | Smith | | A01M 1/145 43/113 |
| 2003/0056426 A1* | 3/2003 | Nelson | | A01M 1/223 43/112 |
| 2004/0160199 A1* | 8/2004 | Morgan | | G09G 3/14 315/312 |
| 2006/0107583 A1* | 5/2006 | Wu | | A01M 1/04 43/113 |
| 2007/0124987 A1* | 6/2007 | Brown | | A01M 1/023 43/113 |
| 2009/0071059 A1* | 3/2009 | Della Torre | | A01M 1/145 43/114 |
| 2009/0139155 A1* | 6/2009 | Kelders | | A01M 1/145 43/113 |
| 2012/0005947 A1* | 1/2012 | Studer | | A01M 1/145 43/58 |
| 2013/0312314 A1* | 11/2013 | Greening | | A01M 1/14 43/114 |
| 2014/0026467 A1* | 1/2014 | Kaye | | A01M 1/145 43/113 |
| 2014/0311015 A1* | 10/2014 | Oehlschlager | | A01M 1/023 43/107 |
| 2017/0339919 A1* | 11/2017 | Avila | | A01K 5/0142 |
| 2018/0027795 A1* | 2/2018 | Janét | | A01M 1/026 |
| 2018/0116196 A1* | 5/2018 | Van Kleef | | A01M 29/12 |
| 2019/0075776 A1* | 3/2019 | Ali | | A01M 1/106 |
| 2019/0141977 A1* | 5/2019 | Smith | | F16B 1/0071 43/113 |
| 2019/0141978 A1* | 5/2019 | Smith | | A01M 1/02 43/113 |
| 2019/0141979 A1* | 5/2019 | Smith | | A01M 1/145 43/114 |
| 2019/0208760 A1* | 7/2019 | Towne | | F21V 23/04 |
| 2020/0260713 A1* | 8/2020 | Parnell | | A01M 1/145 |
| 2022/0039366 A1* | 2/2022 | Parnell | | A01M 1/145 |

FOREIGN PATENT DOCUMENTS

| | | | | | |
|---|---|---|---|---|---|
| CN | 115183199 | A | * | 10/2022 | A01M 1/14 |
| DE | 2811532 | A | * | 6/1979 | A01M 1/02 |
| DE | 3511215 | A | * | 10/1986 | A01M 1/145 |
| DE | 3840440 | A1 | * | 10/1989 | |
| DE | 10236531 | A1 | * | 2/2004 | A01M 1/145 |
| EP | 947134 | A2 | * | 10/1999 | A01M 1/145 |
| EP | 2269448 | A1 | * | 1/2011 | A01M 1/145 |
| GB | 2166034 | A | * | 4/1986 | A01M 1/14 |
| GB | 2275409 | A | * | 8/1994 | A01M 1/145 |
| GB | 2456585 | A | * | 7/2009 | A01M 1/145 |
| GB | 2476389 | A | * | 6/2011 | A01M 1/145 |
| GB | 2484806 | A | * | 4/2012 | A01M 1/026 |
| JP | 2002065137 | A | * | 3/2002 | A01M 1/145 |
| JP | 2020174649 | A | * | 10/2020 | |
| KR | 20100137759 | A | * | 12/2010 | A01M 1/145 |
| KR | 20120029689 | A | * | 3/2012 | |
| KR | 20120132132 | A | * | 12/2012 | |
| KR | 20170114444 | A | * | 10/2017 | |
| KR | 101830394 | B1 | * | 2/2018 | A01M 1/145 |
| WO | WO-0059300 | A1 | * | 10/2000 | A01M 1/14 |
| WO | WO-0122813 | A2 | * | 4/2001 | A01M 1/145 |
| WO | WO-2005053389 | A1 | * | 6/2005 | A01M 1/145 |
| WO | WO-2008096352 | A2 | * | 8/2008 | A01M 1/02 |
| WO | WO-2019112835 | A1 | * | 6/2019 | |

* cited by examiner

LURING INSECT TRAP

BACKGROUND

1. Field

The present general inventive concept relates generally to an insect trap, and particularly, to a luring insect trap.

2. Description of the Related Art

Household pests are a problem for many homeowners. In particular, insects such as fruit flies, beetles, and ants can contaminate and ruin a food supply within a home. The problem can be exacerbated if the insects build a nest within the home.

Some types of traps exist that can capture these insects. Unfortunately, existing traps trap the insect, but leave them visible and plain sight, which can make an environment in the home unclean. Moreover, leaving dead insects around the home can cause a problem for people with pets as well as encourage more insects into the home.

Therefore, there is a need for a luring insect trap that captures insects while keeping them obscured after capture and maintains a pleasant aesthetic.

SUMMARY

The present general inventive concept provides a luring insect trap.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a luring insect trap, including a light unit, a trap unit removably connected to at least a portion of the light unit to store at least one insect attractant therein and receive at least one insect therein, at least one light rod removably connected to at least a portion of the light unit to illuminate in response to being turned on, and a cover panel removably connected to at least a portion of the light unit to obscure the at least one light rod.

The trap unit may include a trap body, and a plurality of trap connecting ridges disposed on at least a portion of the trap body to removably connect the trap body to the light unit.

The trap unit may further include a heating unit disposed within at least a portion of the trap body and connected to the plurality of trap connecting ridges to increase a temperature level within the trap body, such that the heating unit increases an aroma based on the at least one insect attractant emanating from within the trap body.

The trap unit may further include a sensor disposed within at least a portion of the trap body to change a color of the at least one light rod in response to detecting at least one of a movement of the at least one insect, a temperature level of the at least one insect, and a weight of the at least one insect within the trap body.

An interior of the trap unit is coated with an adhesive to prevent the at least one insect from escaping.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
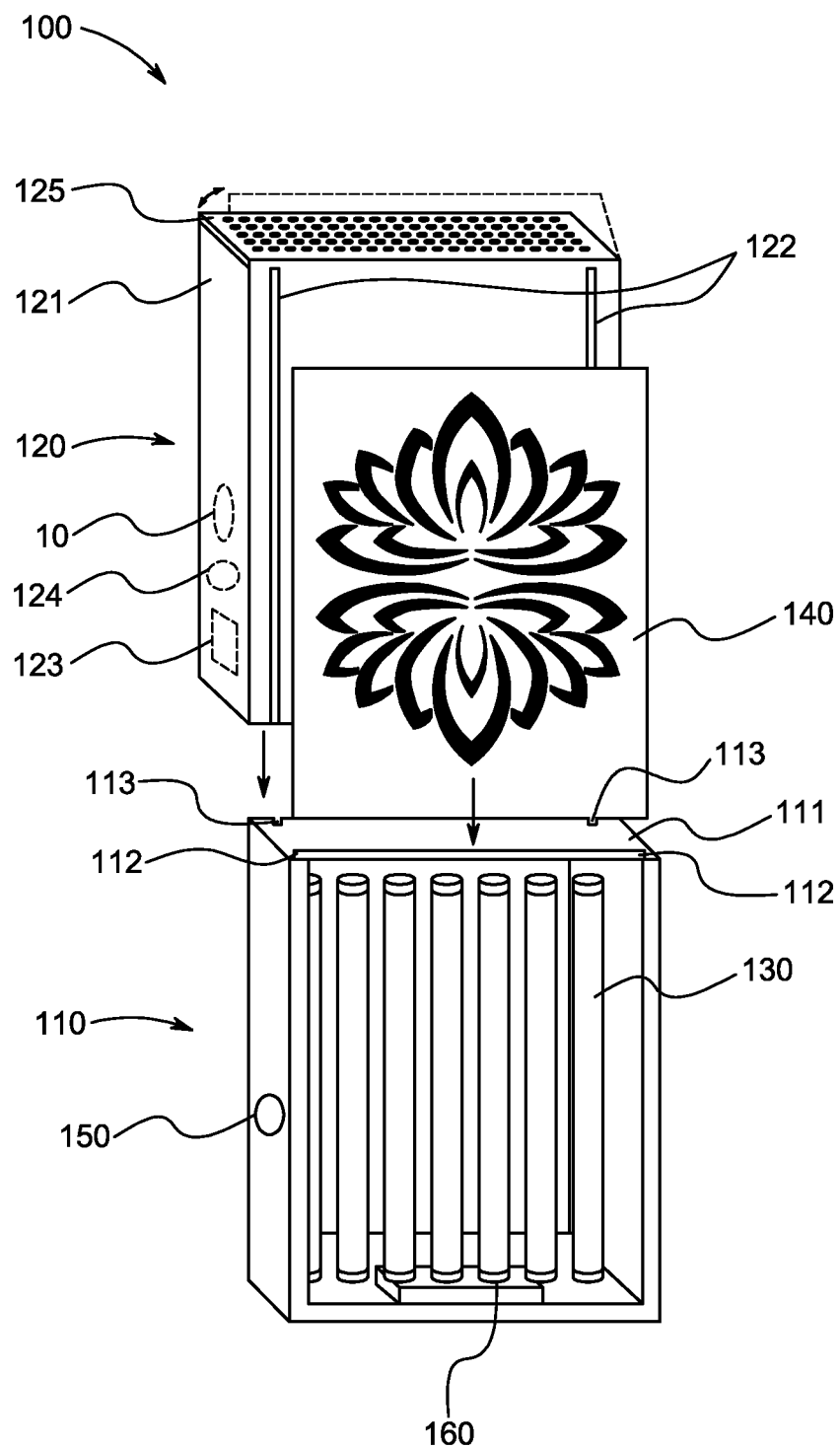
FIG. 1A illustrates an exploded view of a luring insect trap, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Luring Insect Trap 100
Light Unit 110
Main Body 111
Panel Receiving Grooves 112
Trap Connecting Grooves 113
Trap Unit 120
Trap Body 121
Trap Connecting Ridges 122
Heating Unit 123
Sensor 124
Perforated Lid 125
Light Rods 130
Cover Panel 140
Power button 150
Power Source 160
Luring Insect Trap 200
Light Unit 210
Main Body 211
Panel Receiving Grooves 212
Trap Unit 220
Trap Body 221
Perforated Lid 222
Tabs 223
Light Rods 230
Cover Panel 240
Power button 250
Power Source 260

FIG. 1A illustrates an exploded view of a luring insect trap 100, according to an exemplary embodiment of the present general inventive concept.

Figure 1B:
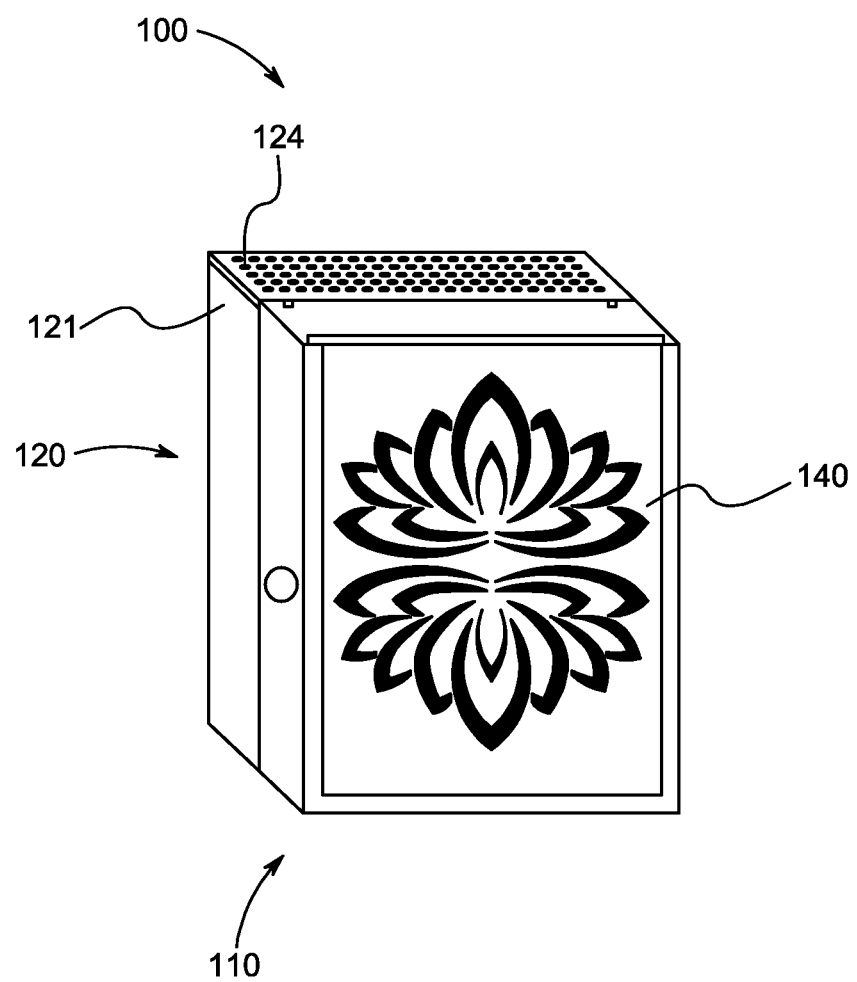
FIG. 1B illustrates a front perspective view of the luring insect trap, according to an exemplary embodiment of the present general inventive concept.

FIG. 1B illustrates a front perspective view of the luring insect trap 100, according to an exemplary embodiment of the present general inventive concept.

The luring insect trap 100 may be constructed from at least one of metal, plastic, wood, glass, and rubber, etc., but is not limited thereto.

The luring insect trap 100 may include a light unit 110, a trap unit 120, a plurality of light rods 130, a cover panel 140, a power button 150, and a power source 160, but is not limited thereto.

The light unit 110 may include a main body 111, a plurality of panel receiving grooves 112, and a plurality of trap connecting grooves 113, but is not limited thereto.

Referring to FIGS. 1A and 1B, the main body 111 is illustrated to have a rectangular prism shape. However, the main body 111 may be rectangular, circular, spherical, triangular, pentagonal, hexagonal, heptagonal, octagonal, or any other shape known to one of ordinary skill in the art, but is not limited thereto.

The main body 111 may be removably disposed on at least a portion of an external surface, such as a table, a wall, a ground surface, etc.

Each of the plurality of panel receiving grooves 112 may be disposed on at least a portion of a first edge and/or a second edge opposite with respect to the first edge on a first side of the main body 111.

Each of the plurality of trap connecting grooves 113 may be disposed on at least a portion of a third edge and/or a fourth edge opposite with respect to the third edge on a second side of the main body 111 and opposite with respect to the first side of the main body 111.

The trap unit 120 may include a trap body 121, a plurality of trap connecting ridges 122, a heating unit 123, a sensor 124, and a perforated lid 125, but is not limited thereto.

Referring again to FIGS. 1A and 1B, the trap body 121 is illustrated to have a rectangular prism shape. However, the trap body 121 may be rectangular, circular, spherical, triangular, pentagonal, hexagonal, heptagonal, octagonal, or any other shape known to one of ordinary skill in the art, but is not limited thereto.

The trap body 121 may be constructed to be opaque to obscure any contents therein. The trap body 121 may be removably connected to at least a portion of the main body 111. Moreover, the trap body 121 may store at least one insect (e.g., a fruit fly, an ant, a beetle, etc.) therein. Also, the trap body 121 may receive at least one insect attractant 10 therein, such as an insect bait, a fruit aroma, a scented compound, a liquid (e.g., apple cider vinegar, one-quarter teaspoon of dish-washing liquid), and/or any combination thereof. In other words, the trap body 121 may be at least partially hollow therein.

Furthermore, an interior of the trap body 121 may be coated with an adhesive (e.g., tape, glue) to prevent the at least one insect from escaping.

The plurality of trap connecting ridges 122 may be disposed on at least a portion of the trap body 121. Additionally, the plurality of trap connecting ridges 122 may have a length equivalent to a length of the trap body 121. Each of the plurality of trap connecting ridges 122 may removably connect to at least one of the plurality of trap connecting grooves 113. In other words, each of the plurality of trap connecting grooves 113 may receive at least of the plurality of trap connecting ridges 122 therein.

The heating unit 123 may include a heating coil, but is not limited thereto.

The heating unit 123 may be disposed within at least a portion of the trap body 121 and/or connected (e.g., physically, electrically) to the plurality of trap connecting ridges 122. The heating unit 123 may increase a temperature level within the trap body 121 in response to being turned on, and turn off in response to being turned off. As such, the heating unit 123 may attract the at least one insect to an interior of the trap body 121. Also, the heating unit 123 may increase an aroma based on the at least one insect attractant 10 emanating from within the trap body 121 by increasing a temperature level of the at least one insect attractant 10. Accordingly, the heating unit 123 may improve a lure of the at least one insect attractant 10 to the at least one insect.

The sensor 124 may include a movement sensor, a temperature sensor, and a weight sensor, but is not limited thereto.

The sensor 124 may be disposed within at least a portion of the trap body 121. The sensor 124 may detect a movement of the at least one insect, a temperature level of the at least one insect, and/or a weight of the at least one insect within the trap body 121.

The perforated lid 125 may be removably connected to at least a portion of the trap body 121. For example, the perforated lid 125 may cover an aperture of the trap body 121 while disposed over the aperture of the trap body 121, and uncover the aperture of the trap body 121 while removed from the trap body 121. Additionally, the perforated lid 125 may facilitate movement of the aroma of the at least one insect attractant 10 within the trap body 121 due to having a plurality of apertures on the perforated lid 125. Furthermore, an interior of the perforated lid 125 may be coated with the adhesive to prevent the at least one insect from escaping.

Alternatively, the perforated lid 125 may be hingedly disposed on the trap body 121, such that the perforated lid 125 may pivot and/or rotate with respect to the trap body 121.

Each of the plurality of light rods 130 may include a light rod, a light bulb, an incandescent light, a light-emitting diode (LED), a halogen light, and a fluorescent light, but is not limited thereto.

The plurality of light rods 130 may be removably connected to at least a portion of the main body 111, such as a light connecting socket. The plurality of light rods 130 may illuminate a surrounding area in response to being turned on, and turn off in response to being turned off.

Also, the plurality of light rods 130 may receive a signal from the sensor 124 to flash, blink, strobe, and/or change color in response to receipt of the at least one insect within the trap body 121.

The cover panel 140 may be removably connected to the plurality of panel receiving grooves 112. In other words, each of the plurality of panel receiving grooves 112 may receive the cover panel 140 therein. The cover panel 140 may be constructed to be transparent and/or at least partially opaque. Moreover, the cover panel 140 may obscure the plurality of light rods 130, such that the plurality of light rods 130 illuminate the cover panel 140. The cover panel 140 may have a design thereon based on a preference of a user.

The power button 150 may be disposed on at least a portion of the main body 111. The power button 150 may turn on the heating unit 123 and/or the plurality of light rods 130 in response to being depressed a first time. Conversely, the power button 150 may turn off the heating unit 123 and/or the plurality of light rods 130 in response to being depressed a second time.

The power source 160 may include a battery, a power inlet, and a solar cell, but is not limited thereto.

The power source 160 may be disposed within at least a portion of the main body 111 and/or connected to the plurality of light rods 130, and the heating unit 123 through a circuit connected to plurality of trap connecting grooves 113 and the plurality of trap connecting ridges 122. The power source 160 may provide power to the heating unit 123, the plurality of light rods 130, and/or the power button 150.

Therefore, the luring insect trap 100 may capture the at least one insect therein, while preventing the at least one insect from being observed. Moreover, the luring insect trap 100 may provide a pleasant aesthetic to a home environment.

Figure 2:
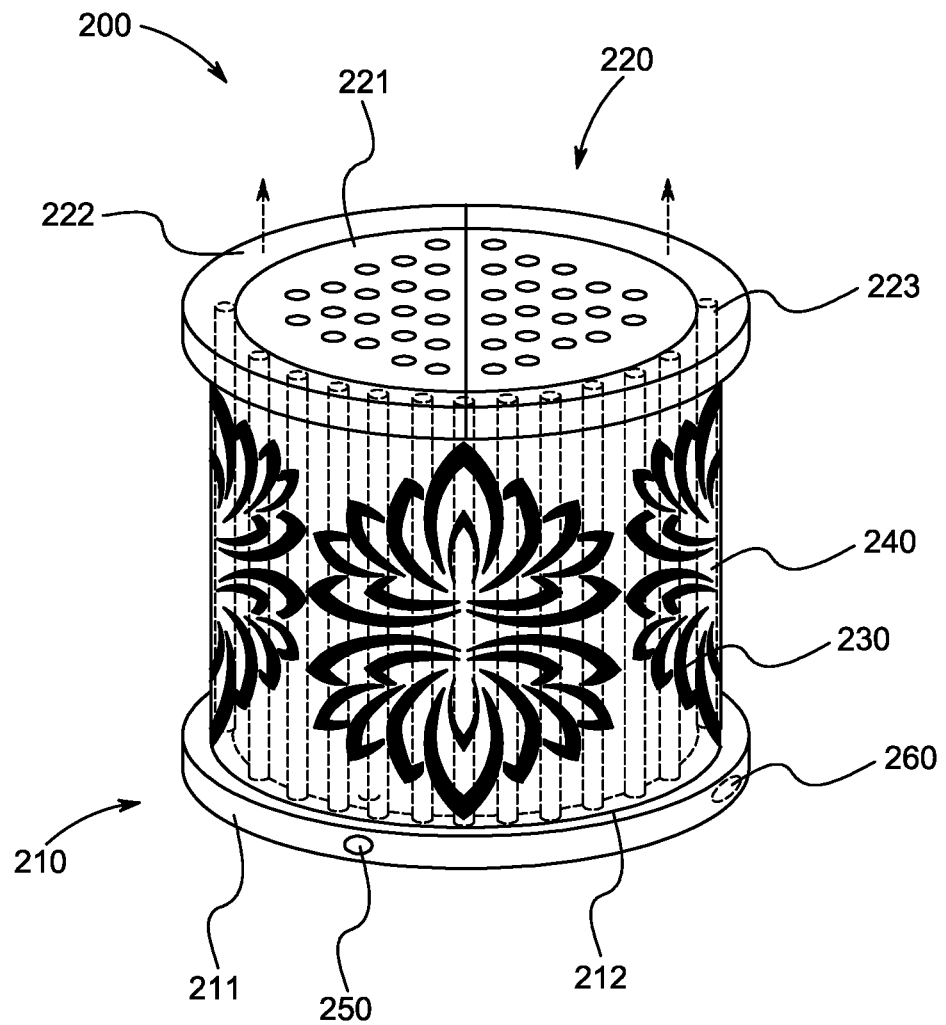
FIG. 2 illustrates a front perspective view of a luring insect trap, according to another exemplary embodiment of the present general inventive concept.

FIG. 2 illustrates a front perspective view of a luring insect trap 200, according to another exemplary embodiment of the present general inventive concept.

The luring insect trap 200 may be constructed from at least one of metal, plastic, wood, glass, and rubber, etc., but is not limited thereto.

The luring insect trap 200 may include a light unit 210, a trap unit 220, a plurality of light rods 230, a cover panel 240, a power button 250, and a power source 260, but is not limited thereto.

The light unit 210 may include a main body 211 and a plurality of panel receiving grooves 212, but is not limited thereto.

Referring to FIG. 2, the main body 211 is illustrated to have a cylindrical shape. However, the main body 211 may be rectangular, circular, spherical, triangular, pentagonal, hexagonal, heptagonal, octagonal, or any other shape known to one of ordinary skill in the art, but is not limited thereto.

The main body 211 may be removably disposed on at least a portion of an external surface, such as a table, a wall, a ground surface, etc.

Each of the plurality of panel receiving grooves 212 may be disposed on at least a portion of the main body 211.

The trap unit 220 may include a trap body 221, a perforated lid 222, and a plurality of tabs 223, but is not limited thereto.

Referring again to FIG. 2, the trap body 221 is illustrated to have a cylindrical shape. However, the trap body 221 may be rectangular, circular, spherical, triangular, pentagonal, hexagonal, heptagonal, octagonal, or any other shape known to one of ordinary skill in the art, but is not limited thereto.

The trap body 221 may be constructed to be opaque to obscure any contents therein. The trap body 221 may be removably connected to at least a portion of the main body 211. Moreover, the trap body 221 may store at least one insect (e.g., a fruit fly, an ant, a beetle, etc.) therein. Also, the trap body 221 may receive at least one insect attractant 10 therein, such as an insect bait, a fruit aroma, a scented compound, a liquid (e.g., apple cider vinegar, one-quarter teaspoon of dish-washing liquid), and/or any combination thereof. In other words, the trap body 221 may be at least partially hollow therein.

Furthermore, an interior of the trap body 221 may be coated with an adhesive (e.g., tape, glue) to prevent the at least one insect from escaping.

The perforated lid 222 may be removably connected to at least a portion of the trap body 221. For example, the perforated lid 222 may cover an aperture of the trap body 221 while disposed over the aperture of the trap body 221, and uncover the aperture of the trap body 221 while removed from the trap body 221. Additionally, the perforated lid 222 may facilitate movement of the aroma of the at least one insect attractant 10 within the trap body 221 due to having a plurality of apertures on the perforated lid 222. Furthermore, an interior of the perforated lid 222 may be coated with the adhesive to prevent the at least one insect from escaping.

Alternatively, the perforated lid 222 may be hingedly disposed on the trap body 221, such that the perforated lid 222 may pivot and/or rotate with respect to the trap body 221.

The plurality of tabs 223 may be disposed on at least a portion of the trap body 221. The plurality of tabs 223 may facilitate gripping thereof. Specifically, the plurality of tabs 223 may facilitate removal of the trap body 221 from the main body 211.

Each of the plurality of light rods 230 may include a light rod, a light bulb, an incandescent light, a light-emitting diode (LED), a halogen light, and a fluorescent light, but is not limited thereto.

The plurality of light rods 230 may be removably connected to at least a portion of the main body 211, such as a light connecting socket. The plurality of light rods 230 may illuminate a surrounding area in response to being turned on, and turn off in response to being turned off.

The cover panel 240 may be removably connected to the plurality of panel receiving grooves 212. In other words, each of the plurality of panel receiving grooves 212 may receive the cover panel 240 therein. The cover panel 240 may be constructed to be transparent and/or opaque. Moreover, the cover panel 240 may obscure the plurality of light rods 230, such that the plurality of light rods 230 illuminate the cover panel 240. The cover panel 240 may have a design thereon based on a preference of a user.

The power button 250 may be disposed on at least a portion of the main body 211. The power button 250 may turn on the plurality of light rods 230 in response to being depressed a first time. Conversely, the power button 250 may turn off the plurality of light rods 230 in response to being depressed a second time.

The power source 260 may include a battery, a power inlet, and a solar cell, but is not limited thereto.

The power source 260 may be disposed within at least a portion of the main body 211 and/or connected to the plurality of light rods 230. The power source 260 may provide power to the plurality of light rods 230 and/or the power button 250.

Therefore, the luring insect trap 200 may capture the at least one insect therein, while preventing the at least one insect from being observed. Moreover, the luring insect trap 200 may provide a pleasant aesthetic to a home environment.

The present general inventive concept may include a luring insect trap 100, including a light unit 110, a trap unit 120 removably connected to at least a portion of the light unit 110 to store at least one insect attractant 10 therein and receive at least one insect therein, at least one light rod 130 removably connected to at least a portion of the light unit 110 to illuminate in response to being turned on, and a cover panel 140 removably connected to at least a portion of the light unit 110 to obscure the at least one light rod 130.

The trap unit 120 may include a trap body 121, and a plurality of trap connecting ridges 122 disposed on at least a portion of the trap body 121 to removably connect the trap body 121 to the light unit 110.

The trap unit 120 may further include a heating unit 123 disposed within at least a portion of the trap body 121 and connected to the plurality of trap connecting ridges 122 to increase a temperature level within the trap body 121, such that the heating unit 123 increases an aroma based on the at least one insect attractant 10 emanating from within the trap body 121.

The trap unit 120 may further include a sensor 124 disposed within at least a portion of the trap body 121 to change a color of the at least one light rod 130 in response to detecting at least one of a movement of the at least one insect, a temperature level of the at least one insect, and a weight of the at least one insect within the trap body 121.

An interior of the trap unit 120 is coated with an adhesive to prevent the at least one insect from escaping.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A luring insect trap, comprising:
   a light unit, the light unit comprising:
      at least one wall forming a first elongate container, wherein the light unit comprises a first longitudinal axis,
      at least one light rod removably connected to at least a portion of the light unit to illuminate in response to being turned on,
      a cover panel removably connected to at least a portion of the light unit to obscure the at least one light rod, and
      a plurality of trap connecting grooves disposed on the exterior of at least a portion of the first elongated container along the first longitudinal axis;
   a trap unit, the trap unit comprising:
      at least one wall forming a second elongated container, wherein the trap unit comprises a second longitudinal axis;
      at least one insect attractant configured to attract at least one insect;
      an interior of the trap unit is coated with an adhesive to prevent the at least one insect from escaping; and
      a plurality of trap connecting ridges disposed on the exterior of at least a portion of the second elongated container along the second longitudinal axis, the plurality of trap connecting ridges cooperating with the plurality of trap connecting grooves to removably connect the second elongated container to the first elongated container;
   wherein each of the first elongated container and the second elongated container is a distinct container having a consistent size and shape after removing the trap unit from the light unit, such that the trap unit obscures an interior of itself while detached from the light unit.

2. The luring insect trap of claim 1, wherein the trap unit further comprises: a heating unit disposed within at least a portion of the second elongated container, the heating unit configured to increase a temperature level within the trap unit, such that the heating unit increases an aroma.

3. The luring insect trap of claim 1, wherein the trap unit further comprises: a sensor disposed within at least a portion of the second elongated container, the sensor configured to change a color of the at least one light rod in response to detecting at least one of: a movement of the at least one insect, a temperature level of the at least one insect, and a weight of the at least one insect within the trap body.

* * * * *